Sept. 18, 1956     S. H. HINE     2,763,772
PHOTOGRAPHIC ILLUMINATING DEVICE
Filed Aug. 25, 1952

INVENTOR.
SHELDON H. HINE
BY
Lockwood, Galt, Woodard, & Smith
ATTORNEYS

United States Patent Office 2,763,772
Patented Sept. 18, 1956

2,763,772
PHOTOGRAPHIC ILLUMINATING DEVICE

Sheldon H. Hine, Fort Wayne, Ind.

Application August 25, 1952, Serial No. 306,127

11 Claims. (Cl. 240—1.3)

The present invention relates to a light source and particularly to a light source for illuminating an object to be photographed.

It is an object of this invention to provide a light source for use in conjunction with a photographic camera for symmetrically and fully illuminating an object to be photographed.

It is another object of this invention to provide a light source for illuminating an object which will reduce the number and intensity of penumbral shadows cast by the object to an appreciable extent.

It is still another object of this invention to provide a coplanar light source adapted to surround the lens of a camera in concentric and coaxial relation therewith.

Other objects will become apparent as the description proceeds.

To the accomplishment of the above and related objects, my invention may be embodied in the forms illustrated in the accompanying drawings, attention being called to the fact, however, that the drawings are illustrative only, and that specific changes may be made in the specific constructions illustrated and described, so long as the scope of the appended claims is not violated.

In the practice of photography, efforts have been constantly made to depict the subject, usually a solid object, such as a manufactured product, in its truest form, free from obscuring shadows, and distracting cross shadows, yet revealing each item of detail clearly and with good form or relief.

Since the beginning of this practice, photographers have realized that as the main source of illumination is moved progressively closer radially inwardly to the camera lens, obscuring shadows cast by the subject are progressively reduced in area. The limiting factor in this practice is the physical size of the light and camera, hence the continuing reduction of shadow area is abruptly halted as the light and camera lens come in to radial contiguity. This contiguous relationship of camera and light, however, still produces shadow area of considerable magnitude.

Early too, it was discovered that this objectionable shadow condition could be further reduced by placing around the camera lens housing a circle of light. This innovation instantly resulted in a very great improvement in the detail presentation of the photograph. Still, for fine reproduction, and even general commercial photography, this circular light had a serious fault; each form or shape was surrounded by a grey fuzz of penumbral shadow, which resulted in an apparent degradation in both brilliance and sharpness. Retouching and extensive blocking were still required to produce clean looking photographs for quality and precision reproduction and engineering use.

In an effort to overcome this fault, a light source forming the subject of this invention was conceived.

Generally, the light source embodiment of this invention hereafter disclosed comprises either a spiral or a series of concentric circles of high intensity fluorescent advertising sign tubing mounted in a protective frame and provided with a plane reflector to promote efficiency. The open center of the spiral is of such diameter and is provided with a tube or lens receptacle such that a photographic lens mounted on a conventional camera can photograph through this open center.

Included in this invention is the principle of spacing the concentric circles of tubing in such a manner as to cancel or render virtually undetectable, the hitherto detracting and troublesome penumbral shadows. In this arrangement, the major source of illumination is provided by tightly spaced and highly concentrated circles or spiral in the central lens area. Spacing of the outer circles approximates a geometric progression, i. e. ¼″—½″—1″—2″. These outer circles serve effectively to cancel, or eliminate the troublesome harsh penumbral shadows produced when a single circle or uniformly spaced circles of light are employed.

The preferred exemplification of the foregoing discussion is explained hereafter in the description of an embodiment and operating principles of this invention.

In the drawngs,

Figure 2:
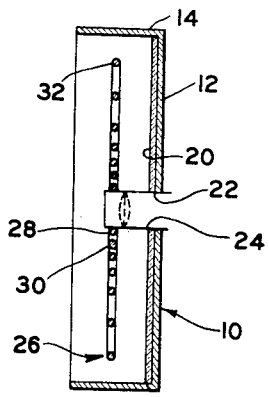
Fig. 2 is a cross section of the embodiment of Fig. 1.
Figure 1:
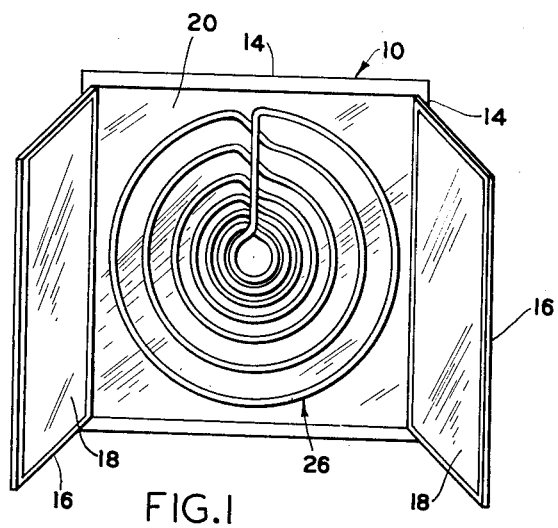
Fig. 1 is a front elevation of an embodiment of this invention.

Referring now to the drawings, the illustrative embodiment is comprised of a housing generally indicated by the reference numeral 10, having a bottom or back side 12 and upright or forwardly extending sides 14. Closure wings 16 are hinged along the vertical edges of two opposite sides 14 and may be swung inwardly to provide a cover for the open end of the housing 10. These wings 16 are preferably provided with reflecting surfaces 18 composed of some mirror-like material.

A mirror type of reflecting surface 20 is also provided on the inside of the bottom 12 for a purpose which will become apparent hereafter. The use of this mirror surface 20 is an alternative construction which need not necessarily be used in the full realization of the improved results achieved in the use of the invention. A tubular support 22 is received by an opening 24 in the bottom 12 and the reflecting surface 20 so as to project into the interior of the housing 10. This tubular support 22 is so designed as to receive therethrough the lens housing projection of a conventional camera; therefore, in the preferred arrangement of this invention, the tubular member 22 has a diametral size which will snugly but slidably receive the lens housing of a camera to be used.

A light source generally indicated by the reference numeral 26 is supported in the housing 10 about the tube 22 by any suitable means. This light source 26 is comprised of a plurality of turns of glass tubing filled with neon gas or the like which will fluoresce or luminesce when suitable electrical field or power is applied thereto. The energization of neon gas in tubular containers is well known to the art and needs no explanation here. Of course, it is not necessary to the present invention that only neon gas be used, and it is within the purview of this invention to include all gases and illuminating materials which may be arranged in the manner of the description to follow.

As explained previously, the glass tubing filled with the neon gas is formed in a spiral coil or a series of concentric circles about the lens support 22, the inner turn 28 snugly encircling the support 22, and the coil 30 being positioned as closely as possible upon the outer periphery of the coil 28. As the number of turns increases, the spacing between the turns increases progressively, so that the spacing between the outer two turns, as will be seen in Fig. 2, is greater than that between any other two turns in the light source. It is important that the turns adjacent the lens support 22 be wound as closely as possible to this support so as to provide the bulk of light produced by the light source adjacent the camera lens. As viewed in Fig. 2, the light source 26 is contained in a single plane normal to the axis of the lens support 22 and is comprised essentially of a lighting construction which will produce maximum brilliancy at or near its central portion, with the average brilliancy decreasing progressively radially outwardly from this central portion. The importance of this distribution of light will be explained more fully hereafter.

Figure 3:
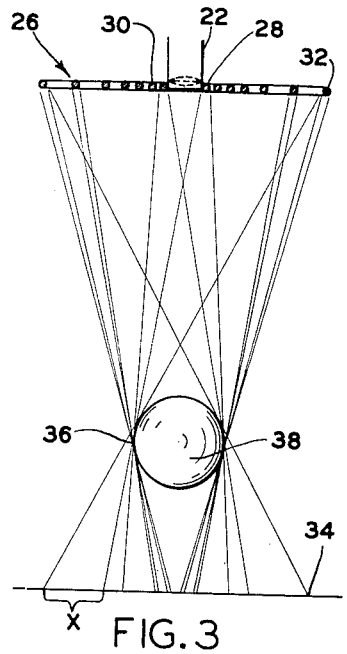
Fig. 3 is a diagrammatic representation of the illumination pattern produced by the present invention.

Referring to Fig. 3, the manner in which the present invention illuminates an object to be photographed is graphically presented, with rays of light from selected ones of the coils being indicated by the solid lines.

Considering first the inner coil 28 and the outer coil 32, ray lines drawn from the right-hand portions of each of these coils to the back-drop 34 across the left edge 36 of an object 38 to be photographed will define an area "X" which is characterized as penumbra or penumbral shadows. Rays may be plotted for the other coils in the light source 26 past both lateral edges of the object 38 for plotting the various penumbrae produced by the individual coils as independent light sources.

In making this plot, it will be discovered that the coil 28 immediately adjacent the camera lens produces the illuminating brilliancy from which a minimum of penumbral shadow will be produced. However, a light penumbral shadow is produced by the coil 28, and if this were the only coil used in the light source for illuminating the object 38, this shadow would appear as a dark fringe or border around the object. This penumbral fuzz or vignetting is extremely objectionable in the matter of photographing intricate objects which cast many shadows which cover certain portions of the object desired to be seen.

By the use of a plurality of concentric coils in the light source 26, it is seen that the light from the outer coils fully illuminates the penumbral shadows cast by the illuminating coils 28, thereby reducing and, in some cases, eliminating the objectionable vignetting or dark borders around the object. Thus, by using the combination of the inner and outer coils in the light source 26, the objectionable penumbral effects are eliminated.

Figure 4:
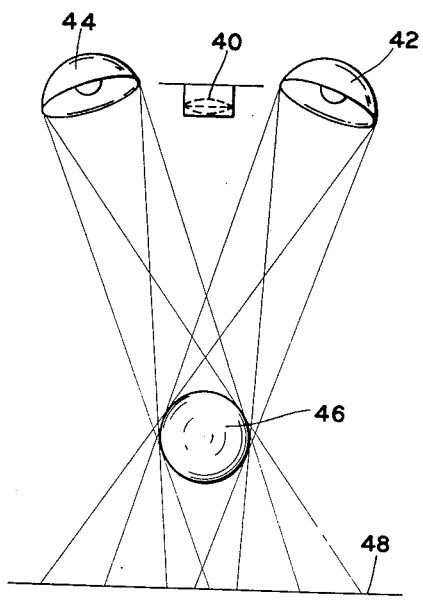
Fig. 4 is a graphic representation similar to Fig. 3 showing the illumination pattern produced by a conventional prior art device.

The importance of this invention can be demonstrated and more fully appreciated by considering the conventional method of lighting as shown in Fig. 4. In this figure, the camera lens is indicated at 40 and two conventional parabolic reflectors 42 and 44 are located on opposite sides of the lens 40. These parabolic light sources 42 and 44 are directed toward the object 46 to be photographed, and as seen from the ray lines extending from the light sources onto the object, certain penumbra are produced on the back-drop 48. When the object 46 is photographed under this system of lighting, dark shadows will appear on opposite sides of the object, each illuminated to half of the total illumination produced by the combined lighting. This produces cross shadow and false outline effects which reduce the clarity and fine detail of the photograph and on which photograph, costly retouching is required for elimination of such effects.

By the use of the present invention, it is entirely possible to eliminate the penumbral border, and as a corollary to produce a photograph of a white object against a white background without the objectionable border appearing in the photo-reproduction.

The light source of the present invention may be characterized as constituted by a series of concentric circles, spirals or a medium of illumination having a high level of brightness at the central portion and progressively decreasing brightness radially outwardly from the central portion.

As described, the wings 16 may be used as reflectors when opened as shown, and as closure covers when the source is readied for transporting.

What is claimed is:

1. A light source for symmetrically illuminating an object comprising a housing having a bottom and four sides, a tubular lens-receiving support centrally affixed to said bottom and projecting upwardly therefrom, a plurality of concentric light sources encircling said support and being spaced apart progressively greater distances radially outwardly from said support, the inner sources being disposed contiguous to said support and to each other, and a mirror surface provided on said bottom for increasing the total amount of illumination delivered by said sources.

2. A light source for symmetrically illuminating an object and for reducing penumbral shadows to a minimum comprising a housing having a bottom portion, an opening provided in said bottom for receiving therethrough a lens housing of a camera, a plurality of illuminating coils supported with respect to said bottom in concentric relation with said opening, said coils arranged concentrically with respect to each other and lying in a common plane normal to the axis of said opening, the inner coils being contiguous with the imaginary axial projection of said opening and the outer coils being separated with progressively greater spacing with respect to each other, and a reflecting surface arranged on said bottom adjacent said coils.

3. A light source for symmetrically illuminating an object and for reducing penumbral shadows to a minimum comprising a housing having a bottom portion, an opening provided in said bottom for receiving therethrough a lens housing of a camera, and a plurality of illuminating coils supported with respect to said bottom in concentric relation with said opening, said coils arranged concentrically with respect to each other and lying in a common plane normal to the axis of said opening, the inner coils being contiguous with the imaginary axial projection of said opening and the outer coils being separated with progressively greater spacing with respect to each other.

4. A light source for symmetrically illuminating an object comprising a housing having a bottom, a tubular lens-receiving support centrally affixed to said bottom and projecting upwardly therefrom, a plurality of concentric light sources encircling said support and being spaced apart progressively greater distances radially outwardly from said support, the inner sources being disposed contiguous to said support and to each other, and a mirror surface provided on said bottom for increasing the total amount of illumination delivered by said sources.

5. A light source comprising a support having an opening, a plurality of circular light sources encircling said opening and carried by said support, said sources lying in a common plane normal to the axis of said opening with the inner source disposed immediately adjacent said opening and the other sources being spaced apart radially outwardly progressively greater distances, and a reflecting surface for said sources interposed between said support and said sources.

6. A light source comprising a support having an opening, and a plurality of circular light sources encircling said opening and carried by said support, said sources lying in a common plane normal to the axis of said opening with the inner source disposed immediately adjacent said opening and the other sources being spaced apart radially outwardly progressively greater distances.

7. A light source for symmetrically illuminating an object and for reducing penumbral shadows to a minimum comprising a support having an opening therethrough, a spiral coil of illuminating tubing concentrically arranged about said opening and fixedly mounted with respect to said support, the spacing of the turns of said spiral coil progressively increasing radially outwardly from said opening.

8. A light source for illuminating an object and for reducing penumbral shadows to a minimum comprising supporting means, camera lens-receiving means included in said supporting means, and a light source which extends over a given area lying in a single plane around said lens-receiving means and carried by said supporting means, said light source comprising illuminating means having light-emitting portions adjacent said lens-receiving means and other light-emitting portions outwardly therefrom which are graded in brilliancy outwardly from said lens-receiving means, the brilliancy of said light-emitting portions adjacent said lens-receiving means being the most intense with the brilliancy of the other light-emitting portions outwardly therefrom progressively diminishing in intensity.

9. A light source for illuminating an object and for reducing penumbral shadows to a minimum comprising supporting means, camera lens-receiving means included in said supporting means, and a light source arranged around said lens-receiving means and carried by said supporting means, said light source comprising illuminating means which is graded in brilliancy outwardly from said lens-receiving means, said illuminating means including light-emitting portions adjacent said lens-receiving means and other light-emitting portions disposed radially outwardly thereof, the brilliancy of said illuminating means adjacent said lens-receiving means being the most intense with the brilliancy outwardly therefrom progressively diminishing in intensity.

10. A light source for illuminating an object and for reducing penumbral shadows to a minimum comprising an area light source which lies in a single plane, said light source having a central light-emitting portion and other light-emitting portions disposed outwardly therefrom, lens-receiving means disposed adjacent said central portion, said light-emitting portions emitting light in a direction normal to said plane and including means for grading the intensity of the light emitted in said direction in a pattern which is most intense adjacent said central portion and progressively less intense outwardly from said central portion.

11. A device of the character described for illuminating an object comprising a light source having a front light-emitting side which extends over a predetermined area about an open central portion, said central portion being adapted to receive a lens, said source comprising illuminating means having light-emitting portions arranged in radial depth about said central portion, said light-emitting portions radiating forwardly, the light-emitting portions adjacent said central portion emitting forwardly the most intense light with the other light-emitting portions emitting forwardly less intense light in a pattern which progressively decreases outwardly from the central portion.

References Cited in the file of this patent

UNITED STATES PATENTS

| | | |
|---|---|---|
| 1,216,696 | John | Feb. 20, 1917 |
| 1,775,368 | Methlin | Sept. 9, 1930 |
| 1,950,445 | Braselton | Mar. 13, 1934 |
| 2,038,506 | Cadieux | Apr. 21, 1936 |
| 2,064,354 | Prouty | Dec. 15, 1936 |
| 2,078,573 | Johnson | Apr. 27, 1937 |
| 2,085,580 | Kottlieb et al. | June 29, 1937 |
| 2,398,754 | Morrison | Apr. 16, 1946 |
| 2,501,405 | Noel | Mar. 21, 1950 |

FOREIGN PATENTS

| | | |
|---|---|---|
| 1,007,957 | France | Feb. 13, 1952 |